United States Patent
Kano et al.

(10) Patent No.: US 9,157,479 B2
(45) Date of Patent: Oct. 13, 2015

(54) FINITE LINEAR MOTION GUIDE UNIT WITH CROSS-ROLLER BEARING SYSTEM

(75) Inventors: Shinji Kano, Gifu-ken (JP); Tsuguyoshi Nara, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 107 days.

(21) Appl. No.: 13/415,280

(22) Filed: Mar. 8, 2012

(65) Prior Publication Data
US 2012/0243811 A1  Sep. 27, 2012

(30) Foreign Application Priority Data
Mar. 24, 2011  (JP) ................................. 2011-066428

(51) Int. Cl.
  *F16C 19/38*  (2006.01)
  *F16C 33/46*  (2006.01)
  *F16C 29/04*  (2006.01)

(52) U.S. Cl.
  CPC ........... *F16C 33/4605* (2013.01); *F16C 29/041* (2013.01)

(58) Field of Classification Search
  CPC .............. A47B 2210/0035; A47B 2210/0037; A47B 2210/004; F16C 29/04; F16C 29/041; F16C 29/043; F16C 33/3806; F16C 33/46; F16C 33/4605; F16C 33/4617; F16C 33/4652; F16C 33/467; F16C 33/585
  USPC ............. 384/19, 38, 50, 51, 55, 57, 523, 525, 384/526, 572, 573, 614, 621, 623
  See application file for complete search history.

(56) References Cited

U.S. PATENT DOCUMENTS 3,811,744 A  *  5/1974  Wren et al. .................... 384/623
  2001/0048776 A1*  12/2001  Kawaguchi et al. ............. 384/51
  2010/0247007 A1*  9/2010  Kanoh ............................ 384/57

FOREIGN PATENT DOCUMENTS

JP  3950683 B2  4/2007
  JP  2010-236604 A  10/2010
  JP  2012-21572 A  2/2012

* cited by examiner

Primary Examiner — Richard W Ridley
Assistant Examiner — Brian McGovern
(74) Attorney, Agent, or Firm — Browdy and Neimark, PLLC

(57) ABSTRACT

A synthetic resin-made cage plate to retain rollers lies between guideway members. The smaller pitch between the adjacent rollers in a cage results in the greater number of the rollers lying in a preselected length of the cage to get heavier load-carrying capacity. A holder to receive a pinion is molded integrally with the cage plate. The rollers are retained in openings in the cage plate at a tilt such that their rotating axes are perpendicular to the lengthwise direction of the raceway surfaces and also tilting at 45 degrees relative to major surfaces of the cage plate. The openings on their contour edges have bearing lips to retain end surfaces of the rollers. The cage plate has flanges extending lengthwise on its' widthwise opposite edges and bulging sidewise out over the major surfaces of the cage plate to render the cage plate tougher to warp or bend.

2 Claims, 7 Drawing Sheets

FINITE LINEAR MOTION GUIDE UNIT WITH CROSS-ROLLER BEARING SYSTEM

FIELD OF THE INVENTION

The present invention relates generally to a linear motion guide unit of the type hereinafter referred to as "finite linear motion guide units" because of their construction where paired lengthwise guideway members are movable in a longitudinal direction with respect to each other across a preselected distance through rollers which are held in a cage interposed between the guideway members, the rollers being arranged in the cage in a fashion lying alternately in oblique opposition each other.

BACKGROUND OF THE INVENTION

Advanced linear motion guide units recently find more extensive applications in any relatively sliding components in machinery as diverse as semiconductor fabricating equipment, machine tools, assembling machines, industrial robots, and so on, and further expected to work with high accuracy while getting smaller and smaller in construction. Encouragement in the recently remarkable downsizing and high-functionality in electronics engineering technology, moreover, calls for the linear motion guide units which can operate with accuracy and high-load capacity even more downsized or compact in construction and further conform to growing demands for high speed operation and high acceleration/deceleration. Especially, the finite linear motion guide unit with cross-roller bearing system is needed to have design for ease of assembly in addition to the downsizing in construction, high-load capacity, high speed operation and high acceleration/deceleration as stated earlier.

Most of prior finite linear motion guide units have a pair of elongated guideway members moveable relatively to each other, and a cage or retainer lying between the guideway members to space away the rollers from each other at preselected intervals The cage or retainer is constituted with a retainer plate which is set to travel over a distance of stroke half the relatively moving stroke of the guideway members. With the finite linear motion guide units constructed as stated earlier, however, the cage or retainer is likely to be off or stray in increments out of a desired location it should be relative to guideway members because of different working conditions including variations in load carried on the finite linear motion guide unit, machining deviations or inaccuracy in the shape of the raceway grooves cut on the guideway members, working geometry where the guide unit operates in an upright posture, high traveling velocity, high acceleration/deceleration, and so on. To cope with the issue stated earlier, most of the finite linear motion guide units have conventionally the cage with means for keeping the cage against straying or wandering from the desired location. A common example of the prior means for preventing the cage from straying installed in the finite linear motion guide units is composed of a rack-and-pinion mechanism in which the cage has a pinion while the guideway members have racks, respectively, so that the pinion comes into mesh with the racks to correct for the relative location of the cage to the guideway members, keeping the cage in place with respect to the guideway members.

In the commonly-assigned Japanese Laid-Open Patent Application No. 2010-236 604, there is disclosed a finite linear motion guide unit designed to carry heavier loads. With the prior finite linear motion guide unit, the smaller pitch or distance between the center-lines of adjacent rollers for rolling elements that are installed in a cage or retainer results in the greater number of the rollers lying in a preselected length of the cage to get an effective raceway area where a raceway groove comes into rolling contact with the rollers as wide as possible to thereby enhance the load-carrying capacity. Moreover, the raceway groove of V-shaped in a transverse section is cut larger in depth to make larger the effective width of raceway surface across which the raceway surfaces of the guideway members come into rolling-contact with the rollers, making certain of the heavier load-carrying capacity. In the prior finite linear motion guide unit, moreover, there is provided a rack-and-pinion mechanism to prevent the cage or retainer from wandering or straying out of a desired location even in high acceleration/deceleration operation. With the rack-and-pinion mechanism as stated earlier, a pinion-holder arrangement is designed to have a size allowed to go in a transverse area of a load-carrying race and the pinion-holder arrangement fits in a window in a cage plate.

With the prior finite linear motion guide unit constructed as stated earlier, however, though the raceway grooves are cut larger in depth as shown in FIG. 2 in the patent literature recited earlier and the cage plate is made as thin as possible to render the raceway surfaces coming into contact with the rollers as large as permitted, there is no provision to retain the rollers in a series of elliptical openings made in the cage plate to fit over the rollers. This means that the rollers are liable to easily fall away from the cage plate of the cage or retainer while in assemblage of the finite linear motion guide unit. As a result, the prior finite linear motion guide unit has been difficult to handle it while in assemblage. With the prior finite linear motion guide unit, moreover, as the pinion-holder arrangement is needed to fit into the window in the cage plate the number of the required parts would increase and the construction would be complicated.

Another commonly-assigned Japanese Laid-open patent application No. 2012-021 572 discloses a finite linear motion guide unit having the construction to retain the rollers in the cage plate for the cage to overcome the shortcomings in the patent literature as stated earlier. With the finite linear motion guide unit in the senior application, however, the cage plate is liable to warp or easily flexible because of too thin in thickness, so that the rollers are apt to easily break up from the cage plate of the cage. Thus, this finite linear motion guide unit is difficult to handle it while in assembling the guideway members with the cage plate having therein the rollers.

SUMMARY OF THE INVENTION

The present invention, therefore, has as its primary object to overcome the major issues discussed earlier and in particular to provide a cage plate most suitable for application to a cage or retainer built in a finite linear motion guide unit. More especially, the present invention is intended to provide a finite linear motion guide unit which uses a cage plate of synthetic resin-made compact sheet having flanges extending lengthwise on widthwise opposite edges of the compact sheet in order for reinforcing benefits to render the cage plate even tougher to warp or bend as well as easier to handle while in assemblage. The flanges are envisaged making use of lengthwise spaces left between beveled edges of guideway members lying oppositely to each other. The cage plate for the cage has a rack-and-pinion mechanism to keep the cage against straying or wandering from the desired location even while in high speed operation and high acceleration/deceleration. A pinion holder for the rack-and-pinion mechanism is molded integrally with the cage plate to get the cage plate downsized and simplified in construction so that the cage plate is improved less in warp and easier in assembly between the guideway members. While based on the cage plate conformable to high speed operation and high acceleration/deceleration in the patent literature recited earlier, the present invention provides the cage plate of synthetic resin-made compact sheet in which the openings made in the cage plate to fit over the rollers have on their circular edges retaining lips to make the cage plate in itself and of itself possible ready to retain or keep the rollers in place so as to facilitate and simplify handling of the rollers and other parts while in manufacture and assembly phases. Moreover, the flanges extending lengthwise on the widthwise opposite edges of the compact sheet bulge sidewise out of side surfaces of the cage plate to an extent that fits inside a sidewise interval between the beveled edges of the guideway members lying in opposition to each other, contributing less warp in the cage plate. Integral molding of the pinion holder with the cage plate helps provide the finite linear motion guide unit that is less in number of required parts, simple and slim in construction and inexpensive in production.

The present invention is concerned with a finite linear motion guide unit with a cross-roller bearing system comprising, a pair of guideway members lying movable relatively to one another and having lengthwise sides confronted with each other and provided thereon with raceway grooves of V-shape in a transverse section, a plurality of rollers for rolling element arranged between raceway surfaces opposed each other on the raceway grooves of the guideway members to roll through on the raceway surfaces on the raceway grooves, and a cage of a cage plate lying in the lengthwise direction between the lengthwise sides of the guideway members and carrying thereon the rollers at preselected intervals in such geometry tilting alternately in opposite direction in perpendicular to one another;

wherein the cage plate is a molding of synthetic resin having a front major surface and a rear major surface lying closer to the sides of the guideway members and extending in parallel with each other, the cage plate having openings to retain therein the rollers in such geometry that their own axes are in perpendicular to the lengthwise direction of the cage plate and tilt at 45 degrees with respect to the major surfaces, the openings being provided on a contour edge thereof with bearing lips to bear the roller for rotation against axially opposite end surfaces of the roller, and further the cage plate having on lengthwise edges thereof flanges which extend lengthwise of the cage plate and bulge sidewise out of the major surfaces to get the cage plate less in warp and bend.

In the present invention, a finite linear motion guide unit with a cross-roller bearing system is disclosed in which the bearing lips formed in pairs at ends of the opening opposite widthwise of the cage plate each have a thickness of half a dimension between the major surfaces of the cage plate to provide a concavity.

In the present invention a finite linear motion guide unit with a cross-roller bearing system is disclosed in which the cage plate is smaller in widthwise dimension than the guideway members and the flanges on the lengthwise edges of the cage plate extend across an overall length of the cage plate while stowed inside the overall length of the cage plate, the flanges being each bulged out sidewise of the cage plate to have a triangular shape in a transverse section to fit inside a sidewise interval between beveled edges of the guideway members lying in opposition to each other.

In the present invention a finite linear motion guide unit with a cross-roller bearing system is disclosed in which the major surfaces of the cage plate spread substantially flat or even around the openings across the overall length of the cage plate and the openings each have a contour of ellipse having a major axis lying in a widthwise direction of the cage plate to fit over the roller while in bearing the roller for rotation in the opening.

In the present invention, a finite linear motion guide unit with a cross-roller bearing system is disclosed in which the cage plate lying between the guideway members has a pinion holder molded integrally with the cage plate so as to bulge out sidewise of the major surfaces of the cage plate, the pinion holder having a recess to attach and/or detach therein a pinion for rotation, and further racks are laid down in relief valleys cut deep between the raceway surfaces of the guideway members, so that after the pinion has come into mesh or mating with the racks, there is provided a rack-and-pinion mechanism serving as a mechanism to prevent the cage plate from wandering or straying out of a desired relative location with respect to the guideway members.

In the present invention, a finite linear motion guide unit with a cross-roller bearing system is disclosed in which the recess cut in the pinion holder is composed of a pinion recess to receive therein a flat disc and successive gear teeth circumferentially spaced at preselected intervals around the flat disc, and a bearing recess extending in perpendicular to the pinion recess to carry a pinion shaft for rotation. Moreover, a plurality of ribs is provided inside the bearing recess in the recess cut in the pinion holder, and the ribs retain the pinion shaft of the pinion for rotation, the pinion shaft extending at a center of the disc in perpendicular to the disc.

With the finite linear motion guide unit with the cross-roller bearing system constructed as stated earlier, the cage plate for the cage interposed between the raceway guides has a plurality of the openings to retain the rollers therein, the openings being out in the cage plate in a formation as closer as possible to each other in the lengthwise direction of the cage plate to get the cage plate heavier load-carrying capacity. Especially, the openings are provided inside with the bearing lips lying restricted only within the thickness defined between the opposite major surfaces of the cage plate to retain the rollers so as not to falling away apart from the cage plate. Thus, the smaller pitch or distance between the adjacent rollers that are installed in a cage results in the greater number of the rollers lying in a preselected length of the cage, and further the raceway groove of V-shaped in a transverse section may be cut larger in depth to make larger the effective width of raceway surface across which the raceway surfaces of the guideway members come into rolling-contact with the rollers, thereby making certain of the heavier load-carrying capacity. With the finite linear motion guide unit with the cross-roller bearing system of the present invention, moreover, the cage plate has flanges extending lengthwise on the widthwise opposite edges of the cage plate and bulging sidewise out over the major surfaces of the cage plate to render the cage plate tougher to warp or bend so as to facilitate handling of the parts while in manufacture and assembly phases. Integral molding of the pinion holder with the cage plate helps lessen the number of parts required in the pinion holder in the rack-and-pinion mechanism, thereby rendering the finite linear motion guide unit simple and slim in construction, easier in downsizing and assemblage.

DETAILED DESCRIPTION OF THE INVENTION

The finite linear motion guide unit with the cross-roller bearing system explained later is adapted for use in between relatively sliding parts of a variety of machinery including semiconductor manufacturing equipment, machine tools, a diversity of assembly machines, various industrial robots, and so on.

Figure 1:
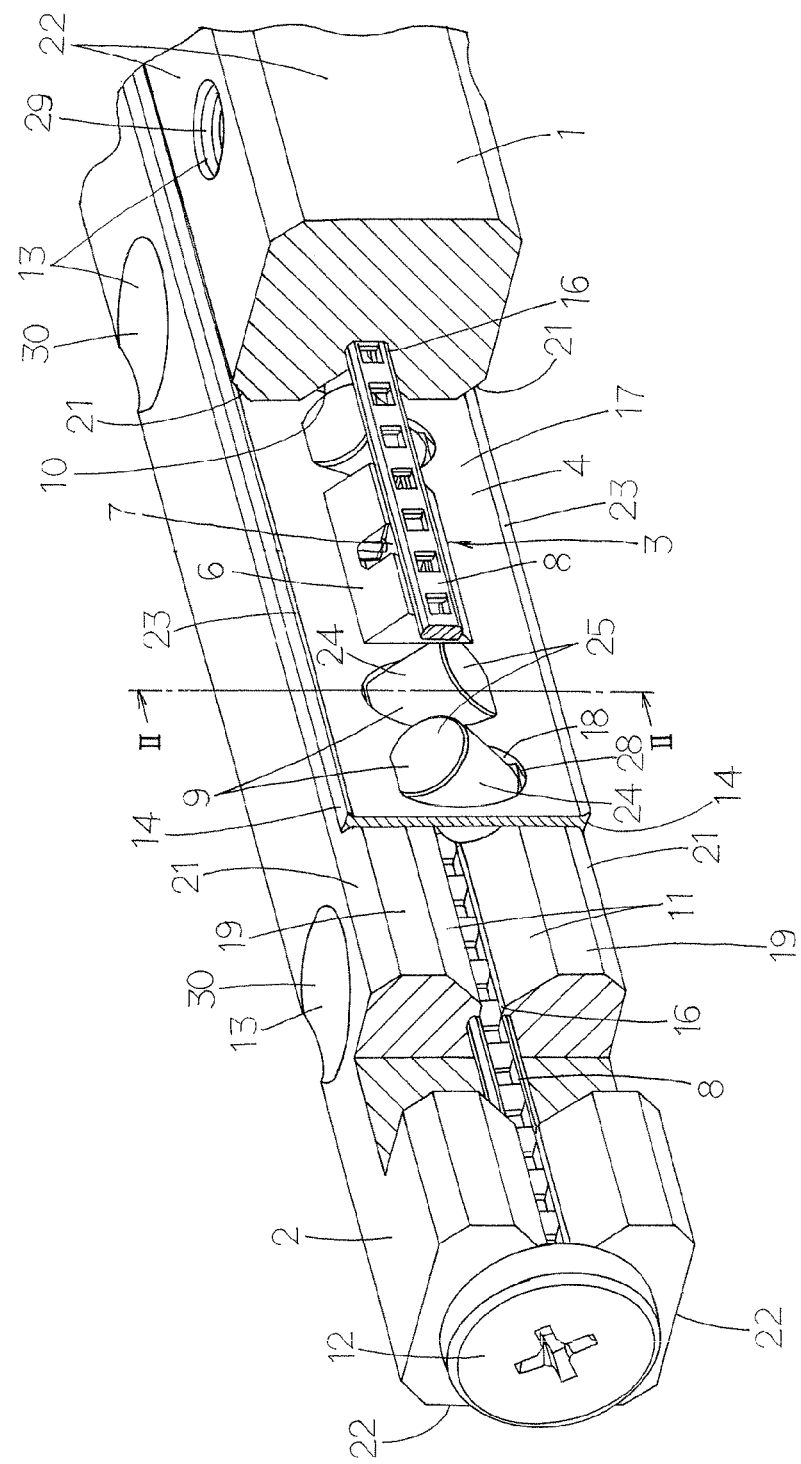
FIG. 1 is a view in perspective, partially broken away, showing a preferred embodiment of a finite linear motion guide unit with cross-roller bearing system according to the present invention.
Figure 2:
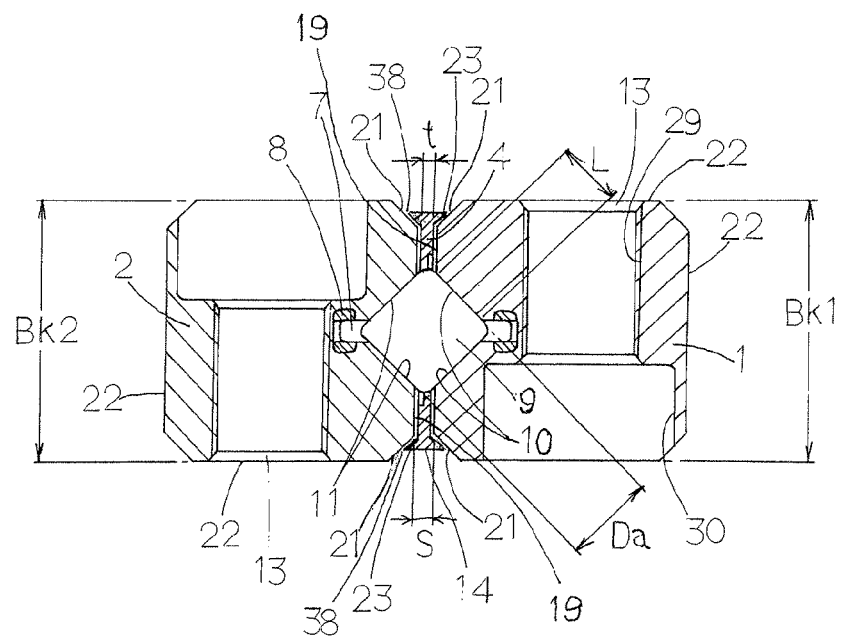
FIG. 2 is a view in transverse section of the finite linear motion guide unit with cross-roller bearing system of FIG. 1, the view being taken along the plane lying on the line II-II of FIG. 1.
Figure 3:
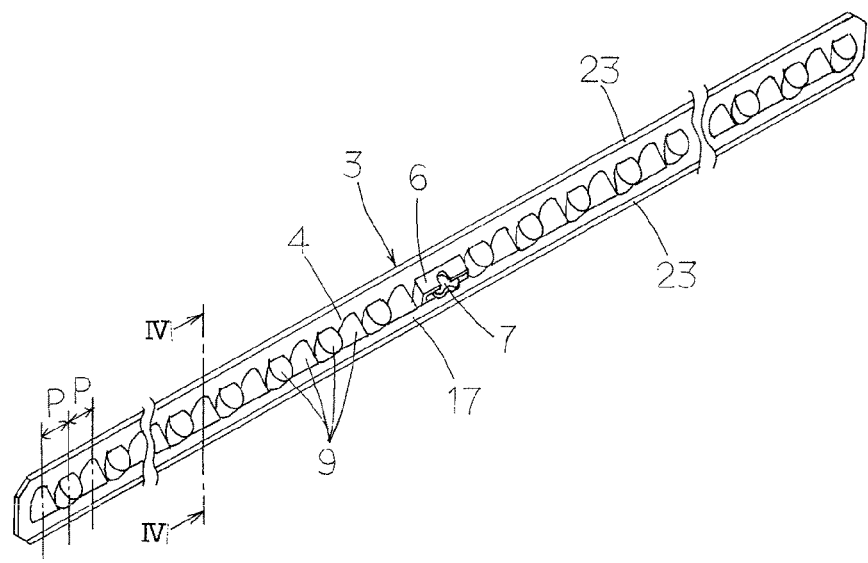
FIG. 3 is a partially broken view in perspective of a cage to be used in the finite linear motion guide unit with cross-roller bearing system of FIG. 1.

The finite linear motion guide unit with the cross-roller bearing system constructed according to the present invention will be described in detail with reference to the accompanying drawings. The finite linear motion guide unit with the cross-roller bearing system of the present invention, as shown in FIGS. 1 to 3, is mainly comprised of a pair of lengthwise guideway members 1 and 2 lying in parallel spaced away from each other across a clearance or interval S to move or travel relatively to each other across a desired distance through a plurality of rollers 9, and a cage 3 lying between the guideway members 1 and 2 to space the rollers from each other at preselected intervals. With the finite linear motion guide unit with the cross-roller bearing system of the present invention, a pinion holder 6 to hold a pinion 7 therein for rotation is molded integrally with a cage plate 4 for the cage 3. Racks 8 having teeth thereon are laid down in relief valleys 16 cut deep between raceway surfaces 10 and 11 of the guideway members 1 and 2. After the pinion has come into mesh or mating with the racks 8, there is provided a rack-and-pinion mechanism to correct for the relative location of the cage 3 to the guideway members 1 and 2, thereby keeping the cage 3 in place with respect to the guideway members 1 and 2 without causing wandering or straying of the cage 3 out of a desired relative location to the guideway members 1 and 2. With the finite linear motion guide unit with the cross-roller bearing system of the present invention, The guideway members 1 and 2, that is, a first guideway member 1 and a second guideway member 2 are made rectangular in a transverse section and have raceway grooves extending lengthwise on their sides 27 facing directly each other. The raceway grooves have each a V-shape in a cross section defined between a pair of raceway surfaces 10 or 11 that extend in parallel with one another to form a relief valley 16 cut deep along a lengthwise bottom of the V-shaped raceway groove. The racks 8 are each placed on the deep bottom of the relief valley 16 to extend lengthwise of the guideway members 1 and 2 and further secured to forward and aft ends of the guideway members 1 and 2 with end screws 12.

The roller 9 is a right circular cylinder whose length is a little below the diameter, that is, about 1:1 and has a rolling or circular surface 24 around a rotating axis and axially opposite end surfaces 25. The rollers 9 are arranged in series in a load-carrying race defined between the raceway surfaces 10 and 11 on the paired guideway members 1 and 2. Especially, the rollers 9 are arranged in a fashion such that any two adjacent rollers 9 are in oblique opposition to each other with their own rotating axes intersecting one another at right angles. With the rollers 9 having a tilt to one direction, their rolling or circular surfaces 24 are in rolling contact with any one of the raceway surfaces 10 of one raceway groove and opposite raceway surfaces 11 of the other raceway groove, while their axially opposite end surfaces 25 are in sliding contact with the other raceway surface 10 of one raceway groove and opposite raceway surface 11 of the other raceway groove. On the other hand, with the rollers 9 having a tilt to opposed direction, their rolling or circular surfaces 24 are in rolling contact with the other raceway surface 10 of the one raceway groove and opposite raceway surface 11 of the other raceway groove, while their axially opposite end surfaces 25 are in sliding contact with the one raceway surface 10 of one raceway groove and opposite raceway surface 11 of the other raceway groove. The rollers 9 are in such a tilt that their rotating axes are in perpendicular to the lengthwise direction of the raceway surfaces 10, 11 and also in tilting at 45 degrees relatively to the sides 19 of the guideway members 1 and 2. A flat cage plate 4 for the cage 3 is placed between the guideway members 1 and 2 facing each other on the sides 19 of the guideway members 1 and 2. The cage plate 4 has the pinion holder 6 which is molded integrally with the cage plate 4 at the lengthwise middle of the cage plate 4. The pinion 7 is carried for rotation inside the pinion holder 6. The pinion holder 6 in the cage plate 4 is flanked by a plurality of the rollers 9 lying midway between widthwise opposed longitudinal edges of the cage plate 4 in such geometry that they are spaced away from each other at preselected intervals. The rack 8 has a ladder-like construction as disclosed in, for example, the commonly-owned JP patent No. 3 950 683. On lengthwise surfaces extending in perpendicular to the sides 19 of the guideway members 1, 2 having the raceway grooves thereon, there are made some bolt holes 13 that are positioned lengthwise at preselected intervals. The bolt holes 13 are countersunk at 30 and internally threaded at 29. The guideway members 1 and 2 on their outer surfaces having threaded holes 29 and their sides opposite to the sides 19 have mounting surfaces 22 to connect the finite linear motion guide unit to other components, instruments, machine bed, and so on.

Next, distinctive constructions in the finite linear motion guide unit with the cross-roller bearing system of the present invention will be explained later with reference to FIGS. 1 to 10. The finite linear motion guide unit with the cross-roller bearing system of the present invention features the cage plate 4 of synthetic resin-made compact sheet which enables the cage plate 4 to have specific configuration advantageous to overcome challenges in the prior art. In addition, the finite linear motion guide unit with the cross-roller bearing system of the present invention has the constructional feature in that the smaller pitch P between the adjacent rollers 9 installed in the openings 18 cut in the cage 3 results in the greater number of the rollers 9 lying in a preselected length of the cage plate 4 to get more adaptive capability to the high acceleration/ deceleration and heavier load-carrying capacity. The cage plate 4 in the present invention is designed to retain the rollers 9 on its own as with the finite linear motion guide unit described in the commonly-assigned Japanese senior patent application No. 2010-159 315 as stated earlier.

Figure 8:
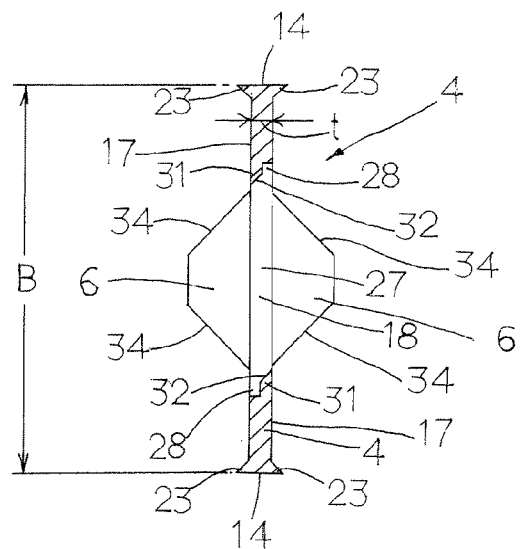
FIG. 8 is a view in transverse section of the cage plate taken along the plane lying on the line VIII-VIII of FIG. 7.
Figure 9:
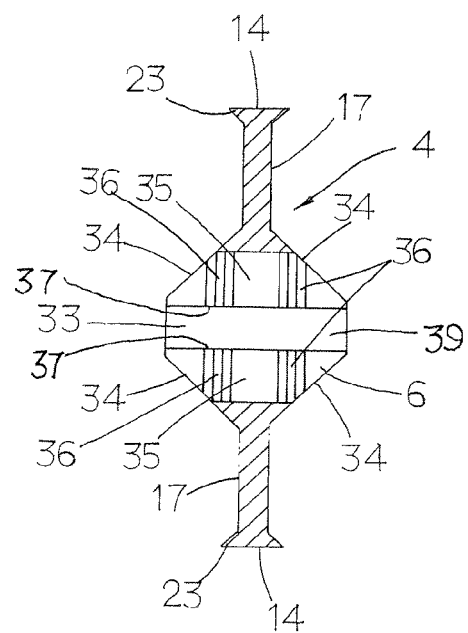
FIG. 9 is an enlarged view in transverse section of the cage plate taken along the plane lying on the line IX-IX of FIG. 7.

With the finite linear motion guide unit with the cross-roller bearing system constructed as stated earlier, moreover, the cage plate 4 is prone to warp or bend under the weight of many rollers retained or held in the cage plate while in assemblage of the cage plate between the guideway members 1 and 2. To cope with this, the cage plate 4 is provided along widthwise opposite edges thereof with flanges 23 which extend lengthwise of the cage plate 4 to protect the cage plate 4 from warping or bending, thereby getting the cage plate 4 higher in strength or stiffness and tougher against breakage or fracture which would cause while in assemblage or in usage. According to the present invention, in addition, the pinion holder 6 to carry the pinion 7 therein is molded integral with the cage plate 4 at the same time as the molding of the cage plate 4. The integral molding of the holder 5 with the cage plate 4 results in simplification in construction of the cage plate 4. The holder 6, as shown in FIGS. 8 and 9, bulges sidewise out of flat major side surfaces 17 of the cage plate 4 to form substantially trapezoidal figures each of which has two slants 34. The pinion 7 may be easily built in the holder 6 after the molding of the cage plate 4. Moreover, the cage plate 4 for the cage 3 may be simply produced by a mold used for synthetic resin molding.

Figure 13:
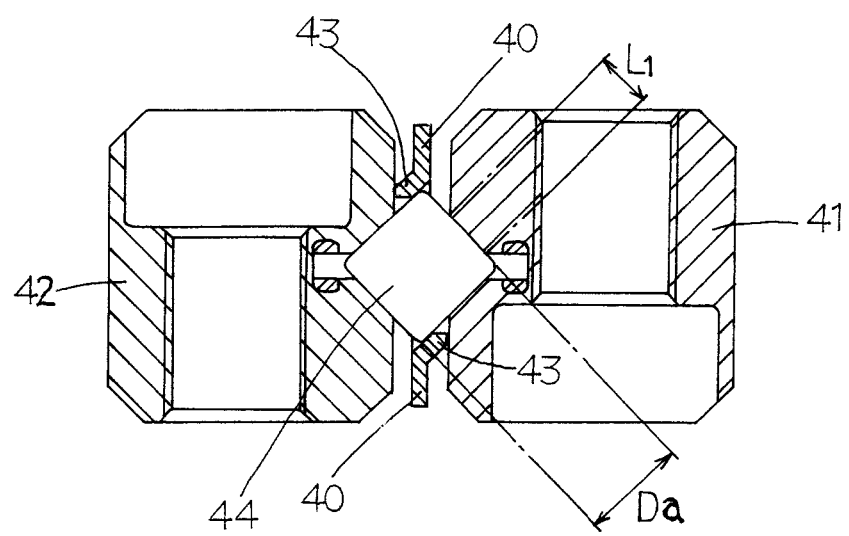
FIG. 13 is a view in transverse section to show the equivalent of FIG. 2 in an example of the conventional finite linear motion guide units.

With the finite linear motion guide unit with the cross-roller bearing system of the present invention, the guide way member 1 and 2, through used as with guideway members in the patent literature recited earlier, each have the raceway groove of V-shape in a transverse section which is cut deeper, compared with the V-shaped raceway groove in the conventional finite linear motion guide unit with the cross-roller bearing system shown in FIG. 13, to render the width L of the raceway surfaces 10 and 11 coming into rolling contact with the rollers larger to get the heavier load-carrying capacity sufficient to carry heavy loads. With the finite linear motion guide unit of the present invention, for example, the raceway surfaces 10 and 11 each had an effective raceway width L2 of 2.73 mm to carry the rollers having a diameter Da of 0.4 mm, as opposed to the conventional finite linear motion guide unit having the raceway surface L1 of 1.88 mm. Thus, it was found that the load-carrying capacity in the finite linear motion guide unit of the present invention was 1.45 times the conventional finite linear motion guide unit.

The guideway members 1 and 2 have bevels 21 on their longitudinal sides 19 confronted directly with each other. The cage plate 4 is interposed between the longitudinal sides 19 of the guideway members 1 and 2. The cage plate 4 is made of a flat thin sheet having front major surface 17 and rear major surface 17 lying in parallel with each other to get closer to the longitudinal sides 19 of the guideway members 1 and 2. The cage plate 4 on widthwise opposite edges thereof has the flanges 23 extending longitudinally across the overall length of the cage plate 4. The flanges 23 are envisaged reinforcing the cage plate 4 in stiffness or rigidity across the overall length of the cage plate 4, thereby getting the cage plate 4 less in warp or bend to prevent the rollers 9 from falling away apart from the cage plate 4. The rollers 9 are retained in the cage plate 4 in a fashion such that their rotating axes alternately tilt 45 degrees in opposition with respect to the major surfaces 17. The cage plate 4 has a width B which is less than widths Bk1 and Bk2 of the guideway members 1 and 2 so as not to be out of the widths Bk1 and Bk2 of the guideway members 1 and 2 to inhibit the sliding movement of the guideway members 1 and 2. The flanges 23 are provided on the widthwise opposite edges of the cage plate 4 to spread sidewise over the front major surface 17 and rear major surface 17 of the cage plate 4, respectively, in the form of triangle in a transverse section so as to lie within a space defined by the beveled edges 21 of the guideway members 1 and 2. The flanges 23 triangular in a transverse section is expected to decrease the warp in the cage plate 4 by, for example, around 35%. As an alternative, recesses larger in size than the bevels 21 as stated earlier may be provided on the guideway members 1 and 2, and correspondingly the flanges 23 may be made larger to fit into the recesses. Moreover, the flanges 23 lie inside a space 38 defined between the bevels 21 of the guideway members 1 and 2 to make use of lengthwise the space 38 left between bevel edges of guideway members 1 and 2 lying oppositely to each other and further to exclude dirt and foreign material out of the space 38 left between the guideway members 1 and 2.

The cage plate 4 for the cage 3 as shown in FIG. 3 has in the lengthwise middle thereof the pinion holder 6 which is molded integral with the cage plate 4. The pinion 7 fits for rotation into the holder 6. The pinion holder 6 is flanked by the rollers 9 which are arranged successively in the lengthwise direction of the cage plate along the widthwise midst of the width B of the cage plate 4. The rollers 9 are arranged in a relation that the adjacent rollers 9 are spaced away apart from each other with a preselected interval or a pitch P. The rollers 9 are retained for rotation in the cage plate 4 in such a disposition that their rotating axes are in perpendicular to the lengthwise direction of the cage plate 4 and also in alternately tilting at 45 degrees in opposition with respect to the major surfaces 17 of the cage plate 4, so that the rotating axes of any two adjacent rollers 9 cross each other at right angles. On the widthwise opposite edges of the cage plate 4, there are formed the flanges 23 which spread sidewise over the major surfaces 17 in the form of triangle in a transverse section and extend across the overall length of the cage plate 4. The smaller the pitch P between the center-lines of adjacent rollers 9 installed in a cage 3 is, the greater is number of the rollers 9 lying in a preselected length of the cage 3. Now considering the roller 9 having a diameter Da (=4 mm), for instance, the pitch P between the adjacent rollers 9 is determined in a relation of P=1.2 Da.

Figure 4:
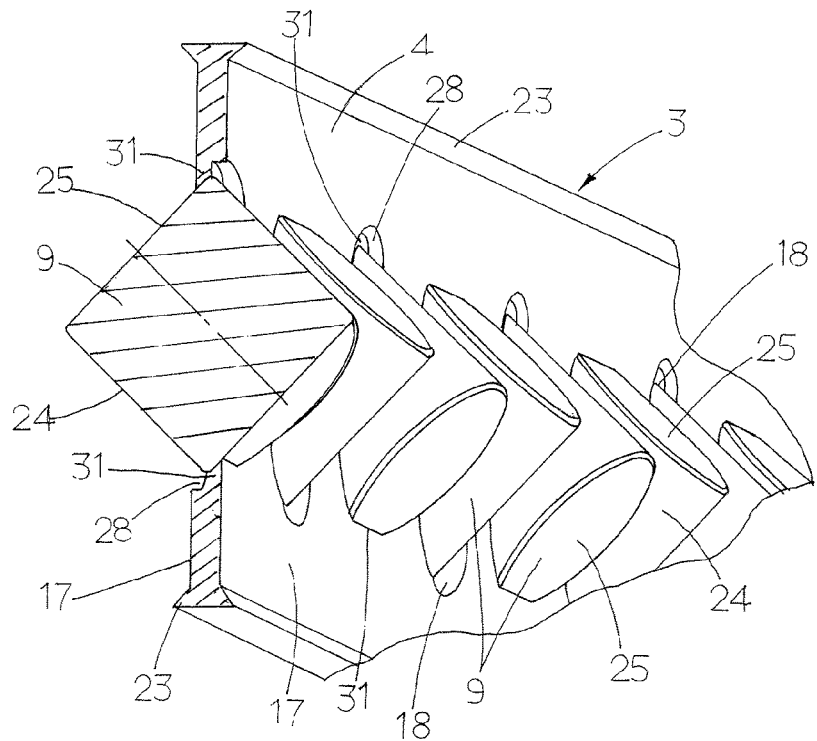
FIG. 4 is an enlarged fragmentary view in perspective of the cage, the view being taken along the plane lying on the line IV-IV of FIG. 3.
Figure 5:
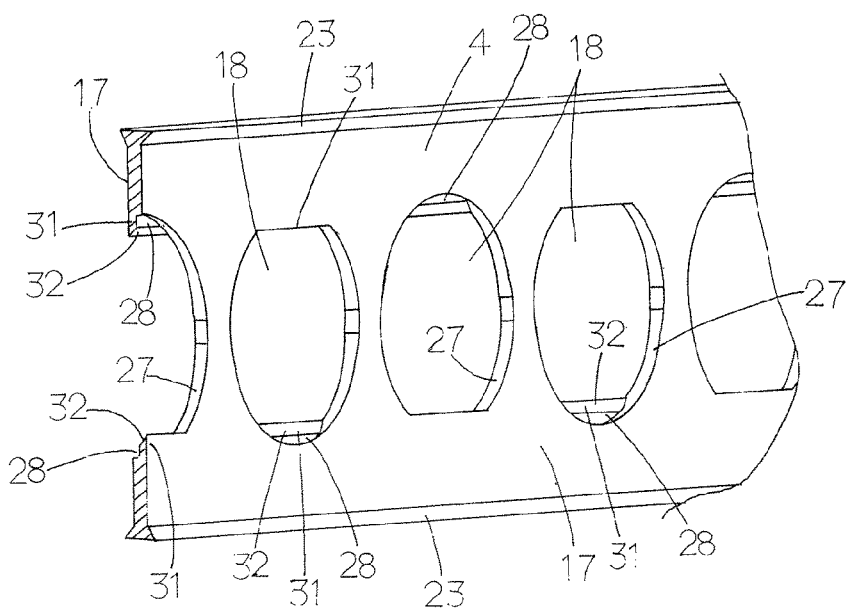
FIG. 5 is an enlarged fragmentary view in perspective of a cage plate, in which rollers are shown as demounted from the cage plate.

The cage plate 4 as shown in FIGS. 4 and 5 has the openings 18 into which the rollers 9 fit loosely for rotation in such a geometry that their rotating axes are in perpendicular to the lengthwise direction of the cage plate 4 and also in alternately tilting at 45 degrees in opposition with respect to the major surfaces 17 of the cage plate 4. The openings 18 as shown in detail in FIG. 5 each have an elliptic contour having a minor axis Wa and a major axis Wb so as to conform to the rolling surface 24 of the roller 9. Moreover, the cage plate 4 in the present invention features the structure in which bearing lips 31 are provided on a circular edge 27 around the elliptic opening 18 in pairs at opposite ends of the major axis of elliptic opening 18 to bear the roller 9 for rotation against the axially opposite end surfaces 25 of the roller 9. The bearing lip 31 is beveled at an inside side thereof to have a bearing slant 32 which is in conformity with the associated end surface 25 of the roller 9. An outside side of the bearing lip 31 is in coplanar or flush with the flat major surface 17 of the cage plate 4. The bearing lip 31 having the bearing slant 32 to support the roller 9 thereon as constructed above will be apparently understood to be quite different in construction and function from the bearing lips 43 which jut sidewise out of the major surfaces of the cage plate 40 interposed between the guideway members 41 in the conventional finite linear motion guide unit as shown in FIG. 13.

Figure 7:
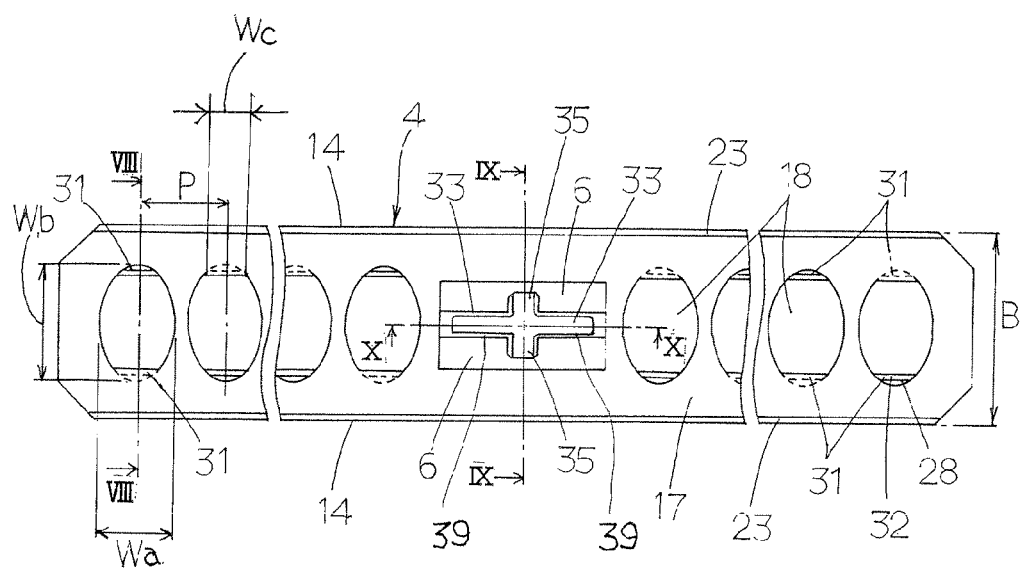
FIG. 7 is partially broken view in plan showing the cage plate with none of the rollers and a pinion.

Referring to FIG. 7, there is shown in detail the bearing lips 31 in the openings 18 in the cage plate 4 used in the finite linear motion guide unit with the cross-roller bearing system of the present invention. Any one, for example upside one of the bearing lips 31 lying in pairs at opposite ends of the major axis of the elliptic opening 18 is in any one of the opposite major surfaces 17 of the cage plate 4 and the other, for example downside bearing lip 31 is in the other major surface 17 of the cage plate 4. With another opening 8 next to the opening 18 as recited just above, the upside bearing lip 31 is in the other major surface 17 of the cage plate 4 and the downside bearing lip 31 is in the one major surface 17 of the cage plate 4. In other words, the bearing lips 31 lying in pairs at opposite ends of the major axis of the elliptic opening 18 are staggered or set-off center from each other in thickness-wise of the cage plate 4 and in opposite directions with respect to a mid plane lying in parallel with and between the opposite major surfaces 17 of the cage plate 4. Moreover, the set-off center or staggered relation between the bearing lips 31 with respect to a mid plane lying between the opposite major surfaces 17 of the cage plate 4 is reversed or turned upside down alternately among the adjoining openings 18 to carry the rollers 9 in a relation their own axes tilt alternately in opposition to each other. The rollers 9 are born against the bearing lips 31 in the openings 18, respectively, with their axially opposite end surfaces 25 coming into sliding contact with the bearing slants 32. The rollers 9 born against the bearing lips 31 come into abutment at the rolling surface 18 near the end surfaces 25 thereof against the curved edges around the openings 18 to get retained in the openings 18. In order to retain the rollers 9 at their rolling surfaces 24 near the axially opposite end surfaces 25 thereof, a dimension Wc across the opening 18 near the bearing lips 31 is set less than the diameter Da of the roller 9.

The cage plate 4 of the present invention as shown in FIG. 8 is made to have the front major surface 17 and the rear major surface 17 opposite to each other, these major surfaces 17 spreading substantially flat or even around the openings 18 across the overall length thereof, except for the lengthwise flanges 23. The bearing lip 31 extending in coplanar with any one of the flat major surfaces 17 of the cage plate 4 from the end 29 towards the center of the opening 18 has a thickness of half, that is, ½×t wherein t is a thickness of the cage plate 4. The remaining thickness is cut away to form a concavity 28. This concavity 28 is used as a space to insert a mold for the bearing lip 31 from other major surface 17 opposite to the major surface 17 on which the bearing lip 31 is molded, in perpendicular to the major surface 17. The concavity 28 serves to get the mold so simple in structure as to make the mold release from the molded article easier, eventually making the production of the synthetic resin-made cage plate 4.

Figure 6:
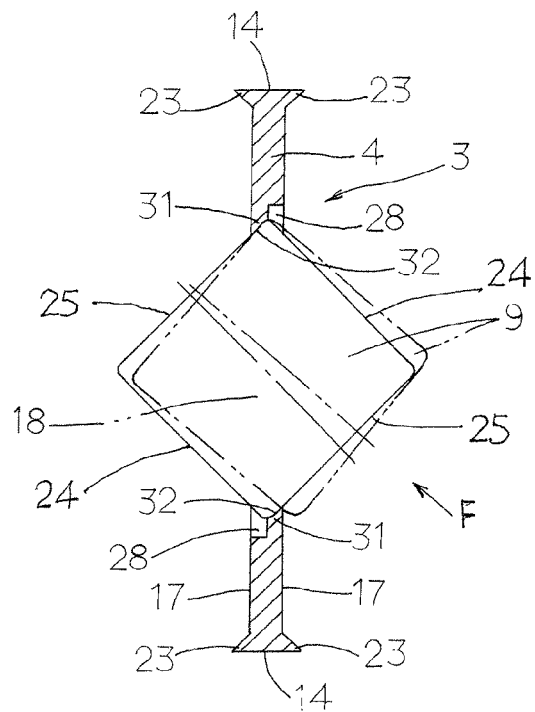
FIG. 6 is an explanatory view to illustrate in detail how rollers are installed in respective openings in the cage plate.

Referring FIG. 6, there is shown how the roller 9 is built in the opening 18 cut in the synthetic resin-made cage plate 4. While the roller 9 is introduced askew into the opening 18 as shown with two-dot chain line with any one of the axially opposite end surfaces 25 of the roller 9 being kept in abutment against the bearing slant 32 on any one bearing lip 31, another end surface 25 of the roller 9 is forced or pushed in a direction of an arrow F so as to get another bearing lip 31 deformed elastically to negotiate or get over the end of the another bearing lip edge 31 whereby the roller 9 fits snugly into the opening 18 as shown with the solid line. Thus, the rollers 9 are mounted and/or demounted from the cage plate 4 with ease.

With the synthetic resin-made cage plate 4 constructed according to the present invention, as shown in FIGS. 7 to 10, the pinion holder 6 to carry the pinion 7 therein is molded integrally with the cage plate 4. As an alternative, the pinion holder 6 may be molded at any location other than the middle of the cage plate 4, depending on required design considerations. The pinion holder 6 is designed to fit snugly or go in just the load-carrying race defined between the raceway surfaces 10 and 11 on the guideway members 1 and 2. The pinion holder 6 is designed to bulge out sidewise when viewed in the lengthwise direction as seen in FIG. 8 and extend in lengthwise direction across the length enough to cover entirely the pinion 7. Bulges of the pinion holder 6 raised above the major surfaces 17 of the cage plate 4 are cut along their ridges to provide a recess 33 of cross shape when viewed in plan as shown in FIG. 7. The pinion 7 is installed in the recess 33 for rotation. The recess 33 cut in the pinion holder 6 is composed of a lengthwise recess 39 extending in the relative sliding direction of the guideway members 1 and 2 to receive therein a flat disc 26 and successive gear teeth 20 of the pinion 7, and a bearing recess 35 extending on both sides of lengthwise recess 39 in perpendicular to the lengthwise direction of the cage plate 4 to carry a pinion shaft 15 for rotation in the bearings. Especially, the lengthwise recess 39 to receive the toothed disc of the pinion 7 is defined between side walls 37 lying at the widthwise midway plane of the pinion holder 6 and extending lengthwise of the pinion holder 6 in parallel with each other, and the bearing recess 35 extends widthwise of the pinion holder 6 at the lengthwise middle of the pinion holder 6.

Figure 10:
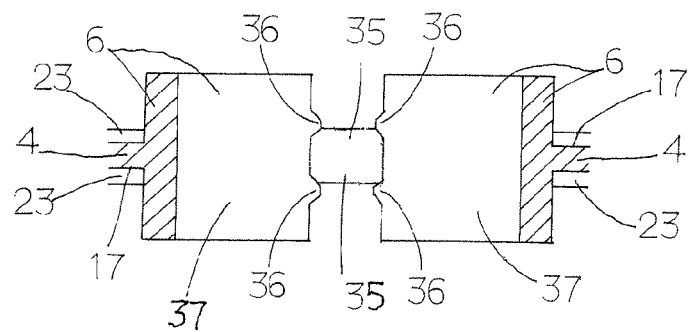
FIG. 10 is an enlarged view in transverse section of the cage plate taken along the plane lying on the line X-X of FIG. 7.
Figure 11:
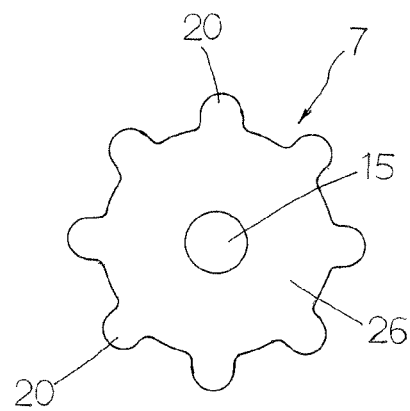
FIG. 11 is an enlarged view in plan showing the pinion to be installed in the cage of FIG. 3.
Figure 12:
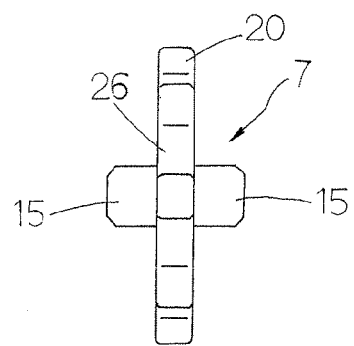
FIG. 12 is an enlarged view in side elevation of the pinion of FIG. 11.

On wall surfaces to define the bearing recess 35 of the recess 33 in the pinion holder 6, there are provided pairs of ribs 36 which are raised slightly above the wall surfaces as shown in FIG. 10 to retain the pinion shaft 15 of the pinion 7 for rotation. The ribs 36 each have a size to make it possible to attach and/or detach the pinion 7 from the bearing recess 33 without effort. The pinion 7 as shown in FIGS. 11 and 12 has the round teeth 20 that mesh with teeth on the racks 8 each of which is laid down in the relief valley 16 cut deep between the raceway surfaces 10 and 10 or 11 and 11 of the guideway members 1 and 2. The teeth 20 of the pinion 7 extend radially at regular intervals around the curved surface of the flat disc 26. At the center of the pinion 7, there is provided the pinion shaft 15 extending sidewise of the both sides of the disc 26. Inside the pinion holder 6, the pinion 7 is carried for rotation with the pinion shaft 15 lying in perpendicular to the lengthwise direction of the cage plate 4.

What is claimed is:
1. A finite linear motion guide unit with a cross-roller bearing system comprising:
 a first guideway member and a second guideway member lying movably relative to one another, each of the guideway members having a longitudinal side confronted with each other and provided thereon with a raceway groove having a V-shape in a transverse section,
 a plurality of rollers arranged between raceway surfaces opposed to each other on the raceway grooves of the guideway members to roll on the raceway surfaces on the raceway grooves, and
 a cage plate lying in a longitudinal direction between the longitudinal sides of the guideway members and carrying therein the rollers at preselected intervals in such geometry that axes of alternative ones of the plurality of rollers are perpendicular to each other;

wherein the cage plate is a molding of synthetic resin having a front major surface and a rear major surface disposed adjacent to each longitudinal side of the guideway members, the major surfaces being parallel to each other, the cage plate having openings to retain therein the rollers in such geometry that the axes of the rollers tilt at 45 degrees with respect to a widthwise direction of the front and rear major surfaces of the cage plate, each of the openings being provided with a contour edge, each contour edge having bearing lips to bear against one of the plurality of rollers for rotation;

further the cage plate having, on widthwise opposite edges thereof, flanges which extend longitudinally along an entire length of the cage plate and bulge out from the front and rear major surfaces of the cage plate to reinforce stiffness and rigidity of the cage plate across the entire length of the cage plate, to reduce warping and bending of the cage plate in the longitudinal direction of the cage plate, and to prevent the rollers from falling away from the cage plate, wherein the bearing lips are formed in pairs in opposition to each other in the widthwise direction of the cage plate, and the bearing lips each have a thickness of half a dimension between the major surfaces of the cage plate, and a respective remaining half of the dimension between the major surfaces of the cage plate adjacent to each bearing lip is cut away to form a concavity in a perpendicular direction with respect to the major surfaces, wherein the cage plate is smaller in a widthwise dimension than a widthwise dimension of the guideway member and the flanges on the lengthwise edges of the cage plate are stowed inside the overall width of the guideway member, and further the flanges have a transverse section having a triangular shape, the flanges each comprise a top that is coplanar with an outer edge of each plate, the flanges fit inside a space defined between beveled edges of the guideway members lying in opposition to each other, and wherein the front major surface and the rear major surface of the cage plate are substantially flat or even around the openings along the entire length of the cage plate and the openings each have a contour of an ellipse having a major axis lying in a widthwise direction of the cage plate to fit over the roller while bearing the roller for rotation in the opening.

2. The finite linear motion guide unit with a cross-roller bearing system as set forth in claim 1, wherein the cage plate lying between the guideway members has a pinion holder integral with the cage plate to bulge out sidewise beyond the front major surface and the rear major surface of the cage plate, the pinion holder having a recess to receive detachably a pinion for rotation, and further each guideway member has a relief valley disposed between the raceway surfaces the relief valley having a rack, so that after the pinion has come into mesh or mating with the racks, there is provided a rack-and-pinion mechanism serving as a mechanism to prevent the cage plate from wandering or straying out of a desired relative location with respect to the guideway members, wherein the recess of the pinion holder is composed of a pinion recess to receive therein a flat disc, and a bearing recess extending in perpendicular to the pinion recess to carry a pinion shaft for rotation, and wherein a plurality of ribs are provided inside the bearing recess in the recess of the pinion holder, the ribs retain the pinion shaft of the pinion for rotation, the pinion shaft extending at a center of the disc and perpendicular to the disc.

\* \* \* \* \*